United States Patent
Wu et al.

(10) Patent No.: US 7,349,909 B2
(45) Date of Patent: Mar. 25, 2008

(54) COMPACT OBJECT HEADER

(75) Inventors: Gansha Wu, Beijing (CN); Guei-Yuan Lueh, San Jose, CA (US); Xin Zhou, Beijing (CN)

(73) Assignee: Intel Corporation, Santa Clara, CA (US)

(*) Notice: Subject to any disclaimer, the term of this patent is extended or adjusted under 35 U.S.C. 154(b) by 326 days.

(21) Appl. No.: 10/790,230

(22) Filed: Mar. 2, 2004

(65) Prior Publication Data

US 2005/0198045 A1   Sep. 8, 2005

(51) Int. Cl.
*G06F 17/30* (2006.01)

(52) U.S. Cl. .................................. 707/100; 707/206

(58) Field of Classification Search ............. 707/8, 707/100, 103 R–103 Z, 101, 206; 711/2, 711/6, 100, 1, 145, 212, 216, 217
See application file for complete search history.

(56) References Cited

U.S. PATENT DOCUMENTS 6,003,123 A  * 12/1999  Carter et al. ................. 711/207
RE37,305 E  *  7/2001  Chang et al. ............... 711/207

OTHER PUBLICATIONS

Jeff Chase, Hank Levy, and Ashutosh Tiwary, "Using Virtual Addresses as Object References", Object Orientation in Operating Systems, Sep. 24-25, 1992, Proceedings of the Second In Workshop, pp. 245-248.*

* cited by examiner

*Primary Examiner*—Cheryl Lewis
(74) *Attorney, Agent, or Firm*—Venable LLP; James R. Burdett

(57) ABSTRACT

A compact object header in which least significant bits of the compact object header store additional information.

25 Claims, 5 Drawing Sheets

COMPACT OBJECT HEADER

BACKGROUND OF THE INVENTION

Modern object-oriented programming languages (OOPL), such as, e.g, Java and C++, are polymorphic and provide many inherent runtime supports, such as, e.g., reflection, garbage collection, language level synchronization, runtime object identification, and the like.

Some runtime support systems may reserve two or more words per object for runtime support. These two or more words may be known as an object header. The first word in a conventional object header is a pointer (i.e., a reference to an address) to a structure of class information for, e.g., virtual method dispatching. The second word in a conventional object header is a word that is dedicated or multiplexed for other runtime supports, such as, e.g., thin-locking, language level synchronization, object hash code, garbage collection and reflection for fast runtime type checking.

Such two-word object headers may be acceptable for desktop and server applications and other applications where space overhead is not a concern. However, these two-word object headers may be less acceptable for embedded and mobile systems that have a strong demand on small heap size, for example.

Attempts to reduce object header overhead have been made by implementing one-word object headers, for example. In one type of one-word object header, a number of bits of the first word stores an index of an array of class information instead of a pointer to the class information. Storing an index of an array of class information can lead to slow virtual method dispatching. Furthermore, in such an array design, the number of bits allocated for the index is controlled. Controlling the allocation of bits restricts how many classes can be loaded.

Other one-word object header designs store a pointer chasing to a so-called near object in the first word. This pointer, in turn, points to the class information. When synchronization or hash code information is requested for the relevant object, a "fat" near object is created to accommodate more information and the object header is redirected to the new near object. This pointer chasing process introduces more complexity in managing the object header and requires an additional pointer chasing for each virtual method dispatch.

BRIEF DESCRIPTION OF THE DRAWINGS

Various exemplary features and advantages of embodiments of the invention will be apparent from the following, more particular description of exemplary embodiments of the present invention, as illustrated in the accompanying drawings wherein like reference numbers generally indicate identical, functionally similar, and/or structurally similar elements.

DETAILED DESCRIPTION OF EXEMPLARY EMBODIMENTS OF THE PRESENT INVENTION

Exemplary embodiments of the invention are discussed in detail below. While specific exemplary embodiments are discussed, it should be understood that this is done for illustration purposes only. A person skilled in the relevant art will recognize that other components and configurations may be used without parting from the spirit and scope of the invention.

Embodiments of the present invention may provide a compact, i.e., one word, object header to enable, runtime supports, such as, e.g., fast virtual method dispatching, thin-locking, generating effective hash codes, and accommodating other uses, such as, e.g., garbage collection and/or reflection.

In an exemplary embodiment of the present invention, a one-word object header may be provided. This one-word object header may be referred to as a compact object header. This compact object header may store a pointer to class information, as well as information including, but not limited to, lock information, hash codes, garbage collection information, and reflection information. This compact object header may, for example, also reserve other bits within the word for other runtime supports, or the like.

In an exemplary embodiment of the present invention, a memory block for storing class information, for example, may be allocated, by a programming system, to an address in memory such that a number of the least significant bits of the address are equal to zero. In exemplary embodiments of the invention, a programming system may be one or more programming languages and software that may be necessary for using these programming languages. Such software may include, but is not limited to: compilers, such as, e.g., ahead-of-time or just-in-time compilers, and runtimes, such as, e.g., garbage collectors. In such an embodiment, the pointer to the memory block for storing class information may be a 32-bit word, for example, that contains the address in which a number of the least significant bits are zero. As will be understood by a person having ordinary skill in the art, class information may be stored as, for example, metadata and/or a table of virtual functions such as, e.g., a vtable. Because the programming system knows that the pointer contains a number of least significant bits that are equal to zero, the programming system may encode, for example, other runtime support information into the least significant bits that are known to be equal to zero. This technique of encoding other information into the one-word pointer may be referred to as "bit stealing".

Figure 1:
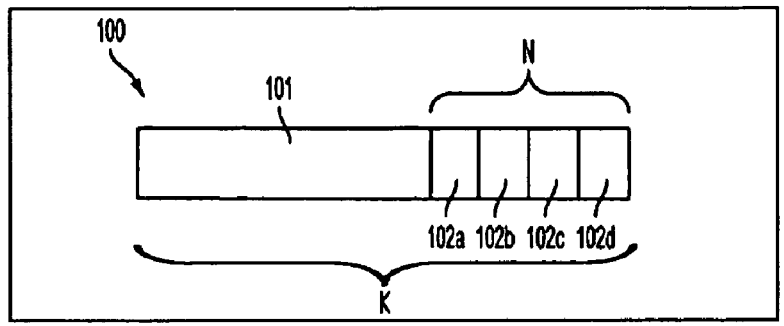
FIG. 1 depicts an exemplary embodiment of a compact object header according to an exemplary embodiment of the invention.

Referring now to the drawings, FIG. 1 represents an exemplary layout of an exemplary embodiment of a compact object header 100. As described above, compact object header 100 may be one word containing, for example, 32 bits. Compact object header 100 may contain a class information pointer 101, and a number of bits N. Bits N may include blocks 102a-102d to store encoded information, for example.

Class information pointer 101 may be a one-word pointer to a block of memory where information about a class may be stored in memory, for example. Class information pointer may be a 32-bit pointer that may reference, or point to, the address in memory where class information is stored for all objects of the same type. Class information about a particular type may be a data structure that may provide for virtual method dispatching and type checking, for example. In an exemplary embodiment of the invention, the address where class information may be stored may be an address in memory such that bits N of the address are equal to zero. Storing the class information at an address where the bits N are equal to zero may enable the programming system (not shown) to encode other information into the bits N, for example. The number of bits N may be any number of bits including, but not limited to 2 to 16 bits, for example. In an exemplary embodiment of the invention, the number of bits N may be 8.

Bits N may include blocks 102a-102d for storing other information relating to the runtime properties of an object, including, but not limited to, reserved bits 102a, hash code or hash code information 102b, lock information 102c, and reflection information 102d. As will be understood by a person having ordinary skill in the art, in exemplary embodiments of the invention, the information that may be stored in blocks 102a-102d may be stored in any order, and may include one, all, or any combination of blocks 102a-102d.

Figure 2:
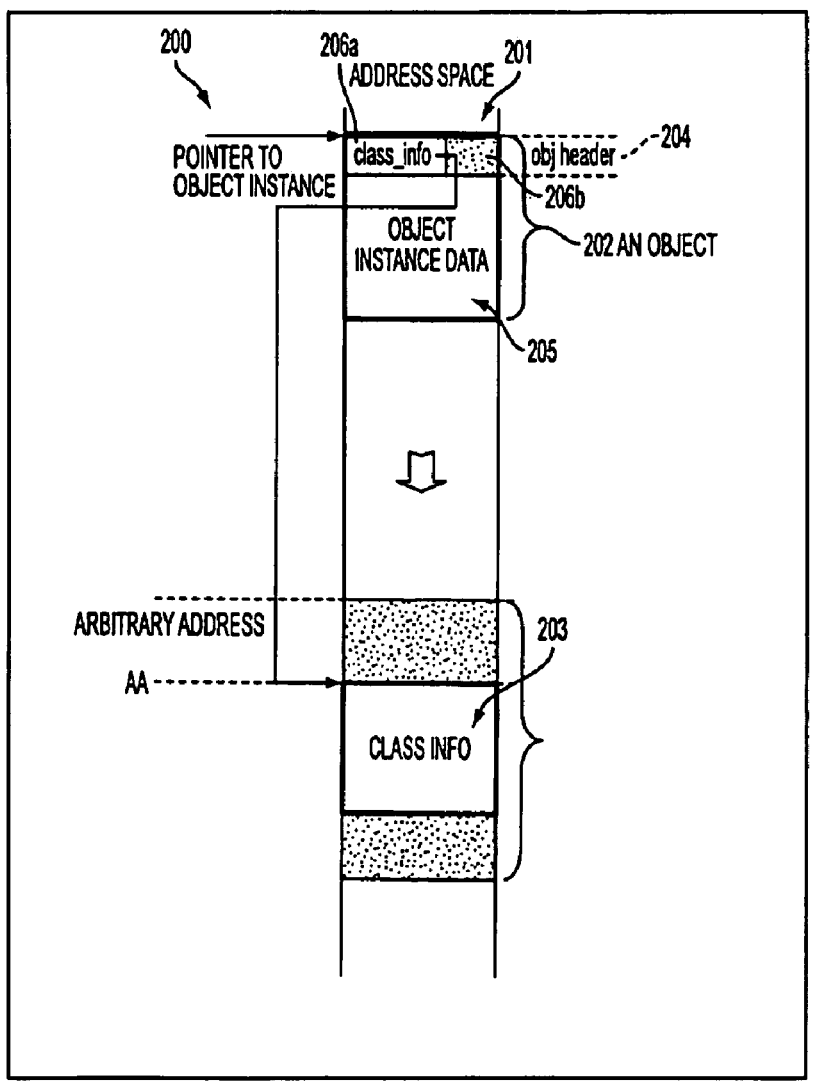
FIG. 2 depicts an exemplary embodiment of a memory snapshot according to an exemplary embodiment of the invention.

FIG. 2 shows an exemplary embodiment of a memory snapshot 200 according to an exemplary embodiment of the invention. Memory 200 may have an address space 201 for storing addressable units, such as, for example, memory blocks 202, 203, in memory. As will be understood by a person having ordinary skill in the art, memory blocks 202, 203 may include one or more words (not shown), for example, that make up each memory block 202, 203. In other words, each memory block 202, 203 may be divided into a plurality of words. Each word within the memory blocks 202, 203 may include any number of bits, such as, for example, 4 to 256 bits. In an exemplary embodiment of the invention, each word may include 32 bits, for example.

Memory block 202 may refer to an instance of an object within the programming system. As can be seen in FIG. 2, memory block or object instance 202 may include a compact object header 204 according to exemplary embodiments of the invention, and object data 205. As discussed above, compact object header 204 may be one word associated with object instance 202. As will be understood by a person having ordinary skill in the art, object data 205 may include, but is not limited to, information about the specific object.

In an exemplary embodiment of the invention, object header 204 may include a pointer 206a to memory block 203 (class information) and least significant bits 206b. As will be understood by a person having ordinary skill in the art, the pointer to memory block 203 may be the actual address AA in address space 201 in which memory block 203 resides. As discussed above, actual address AA may be allocated such that the least significant bits 206b are equal to zero. Knowing that the least significant bits 206b are equal to zero, the programming system may then encode other information, such as, e.g., runtime properties of the object instance stored in memory block 202.

To ensure that the least significant bits 206b are equal to zero, memory block 203 may need to be aligned to an address that is a multiple of $2^n$, where n is the number of least significant bits 206b. For example, as will be understood by a person having ordinary skill in the art, if n is equal to 3, memory block 203 may need to be aligned to an address that is a multiple of 8.

Figure 3:
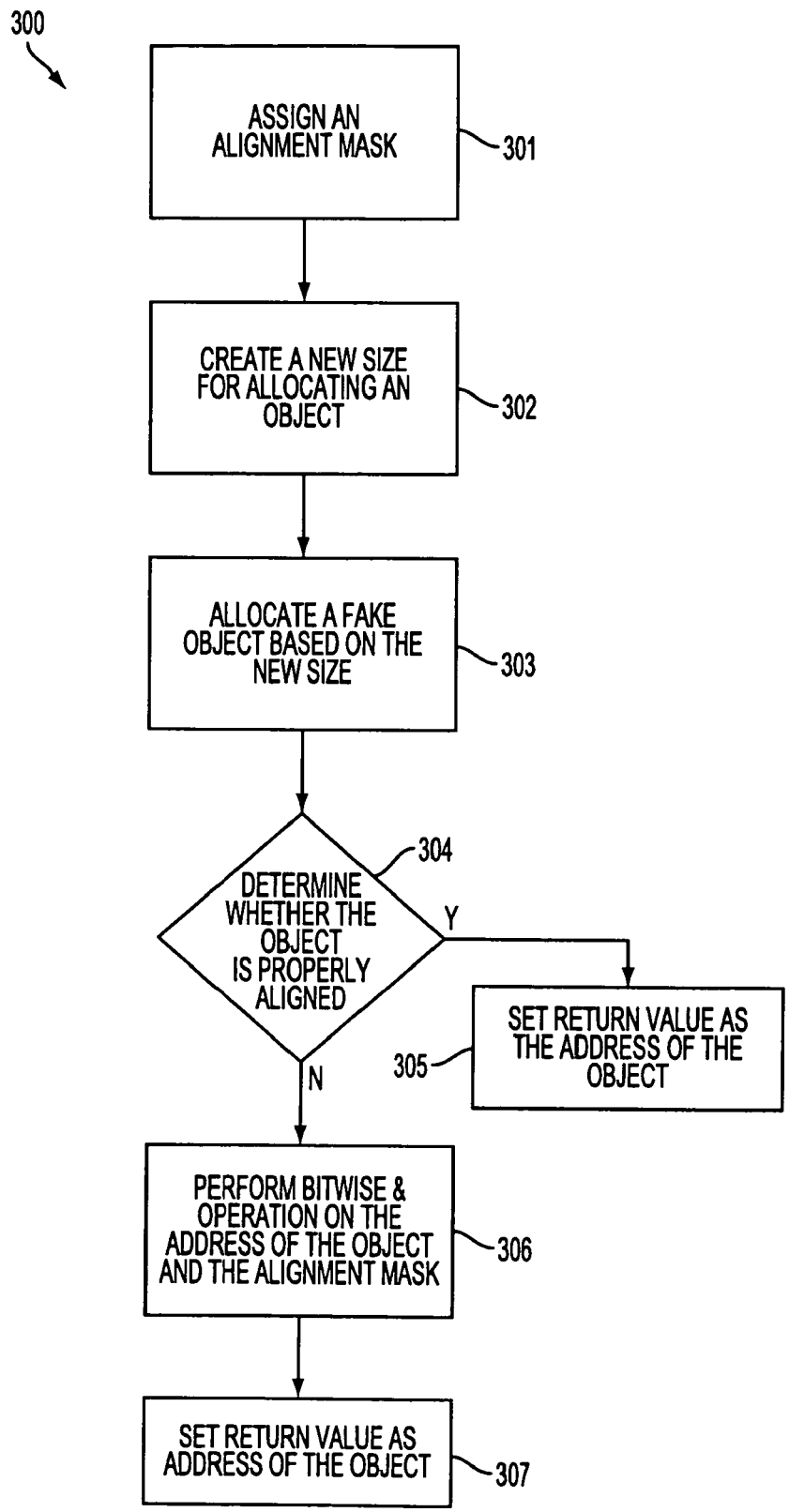
FIG. 3 depicts an exemplary embodiment of allocating objects with alignment according to an exemplary embodiment of the invention.

FIG. 3 depicts a flow chart 300 illustrating an exemplary method for performing an exemplary function to allocate and align memory block 203 such that the least significant bits 206b are zero. The exemplary function may receive two parameters, for example, a size parameter representing a size value and an alignment parameter representing an alignment value. The exemplary function may return a pointer to memory block 203, for example.

In block 301, an alignment mask may be assigned. To assign an alignment mask, the programming system may assume that the alignment parameter is a power of 2. The programming system may then subtract one from the alignment parameter. As will be understood by a person having ordinary skill in the art, subtracting one from the alignment parameter has the effect of making the trailing bits in the resulting value equal to one. The programming system may then perform a complement operation on the resulting value. As will be understood by a person having ordinary skill in the art, performing the one's complement operation on the resulting value will produce a value having leading bits equal to one and trailing bits equal to zero. The value having trailing bits equal to zero may then be assigned to the assignment mask.

In block 302, a new size for allocating an object may be created. To create this new size, the programming system may add the alignment and size parameters. The sum of the alignment and parameters may be assigned as the new size. As will be understood by a person having ordinary skill in the art, the new size may be larger than the size parameter.

In block 303, the programming system may allocate an object based on the new size. This object based on the new size may be referred to as a "fake object". Such an object may have an arbitrary address, as is noted in FIG. 2.

In block 304, the programming system may then determine if the "fake object" is properly aligned. To determine if the "fake object" is properly aligned, the programming system may perform a bitwise AND operation on the "fake object" and the alignment mask and then determine if the result of the bitwise AND operation is equal to the "fake object". If the result of the bitwise AND operation and the "fake object" are equal, the "fake object" is already aligned. The programming system may then set the return value, i.e., the pointer, to the address of the "fake object" in block 305.

If the "fake object" is not aligned, in block 306, the programming system may perform a bitwise AND operation on the "fake object" and the alignment mask and add the resulting value to the alignment parameter. The resulting value may be properly aligned and may be set as the address of the object in block 307.

Once a memory block or class information 203 has been aligned according to exemplary embodiments of the present invention, the programming system may allocate object instances 202 of that type and encode other information into the least significant bits 206b.

As discussed above, in exemplary embodiments of the invention, several types of information including, but not limited to, information related to fast virtual method dispatching, thin-locking, generating effective hash codes, and accommodating other uses, such as, e.g., garbage collection and/or reflection may be encoded into the least significant bits 206b. In an exemplary embodiment of the invention, the information can be encoded in a particular order. In another exemplary embodiment of the invention, the information may be encoded randomly. Further, in an exemplary embodiment of the invention, any number of the least significant bits 206*b* may be reserved for any other use, for example.

Figure 4:
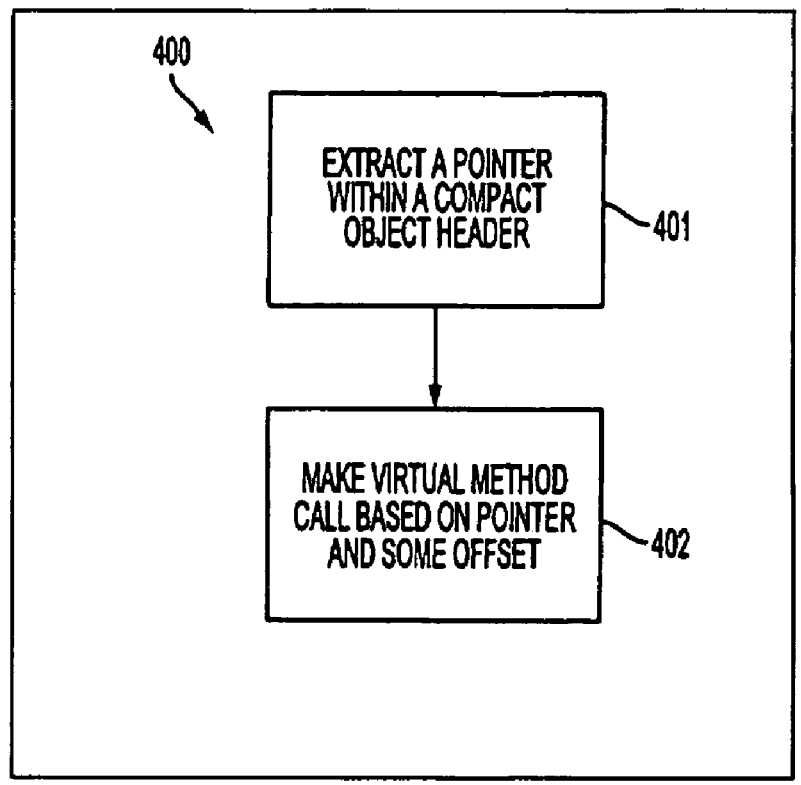
FIG. 4 depicts an exemplary embodiment of a method invocation according to an exemplary embodiment of the invention.

FIG. 4 depicts flow chart 400, which illustrates an exemplary method for efficient virtual method dispatching according to an exemplary embodiment of the invention. In block 401, a pointer to class information may be extracted from a compact object header according to embodiments of the present invention. To extract the pointer from the compact object header efficiently, the pointer may be placed in the most significant bits of the compact object header so that it may be computed by a bitwise-AND of the object header word and an alignment mask. In block 402, a virtual method may be called based on the pointer and an offset.

In an exemplary embodiment of the invention, information relating to synchronization support (i.e., locking information) may be encoded into the least significant bits 206*b*. In an exemplary embodiment of the invention, a two-bit locking scheme may be used. In other words, locking information may be encoded into two of the least significant bits of a compact object header. In an exemplary embodiment of the invention, this two-bit locking scheme may incorporate aspects of a thin lock, as would be understood by a person having ordinary skill in the art, for example, in uncontention cases. In a further exemplary embodiment of the invention, more than two bits may be used for synchronization support. For example, a three-bit locking scheme may be used to encode locking information into three of the least significant bits of a compact object header.

Figure 5:
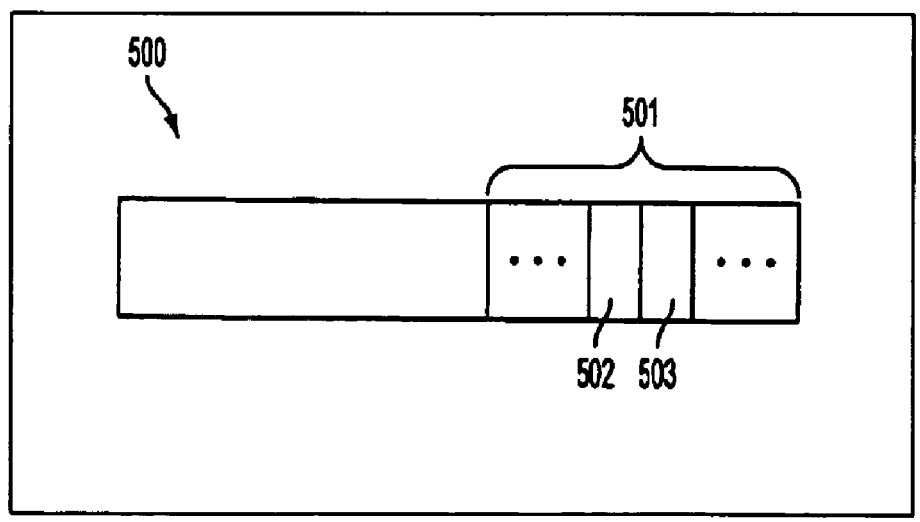
FIG. 5 depicts an exemplary embodiment of a compact object header according to an exemplary embodiment of the invention.

FIG. 5 illustrates an exemplary embodiment of a two-bit locking scheme according to an exemplary embodiment of the invention. As would be understood by a person having ordinary skill in the art, in a mobile and/or embedded environment, numerous locks may be performed by one thread (i.e., a main thread) without recursive reentrant locking. As is shown in FIG. 5, the two-bit locking scheme may be encoded into the N least significant bits 501 of a compact object header 500. The first lock bit 502 may be a flag indicating whether or not an object associated with compact object header 500 has been locked. The second lock bit 503 may imply whether or not the object is locked in an "easy" manner.

As can be seen below, Table 1 illustrates exemplary an exemplary table of lock states of an exemplary two-bit locking scheme according to an exemplary embodiment of the present invention. As is shown in Table 1, two bits of "00" (i.e., the first and second lock bits are equal to zero) may represent a "free lock." When a lock is "free", the corresponding object may not be locked by any thread in the processing system. Two bits of "10" (i.e., the first lock bit is equal to one and the second lock bit is equal to zero) may represent an "easy" lock. When a lock is "easy", the corresponding lock may be locked only once by the main (or the first) thread. Two bits of "11" (i.e., the first and second lock bits are equal to one) may represent a "heavy" lock. A "heavy" lock may indicate that the corresponding object may be locked by a thread other than the main thread, namely, thread n, where n is greater than one, or recursively locked by thread one (i.e., the main thread).

TABLE 1

Exemplary Two-bit Locking Scheme

| Two-bit lock set | First lock bit (owner) | Second lock bit (recursion counter) | State |
| --- | --- | --- | --- |
| 00 | 0 | 0 | free |
| 10 | 1 | 0 | easy |
| 11 | 1 | 1 | heavy |

Figure 6:
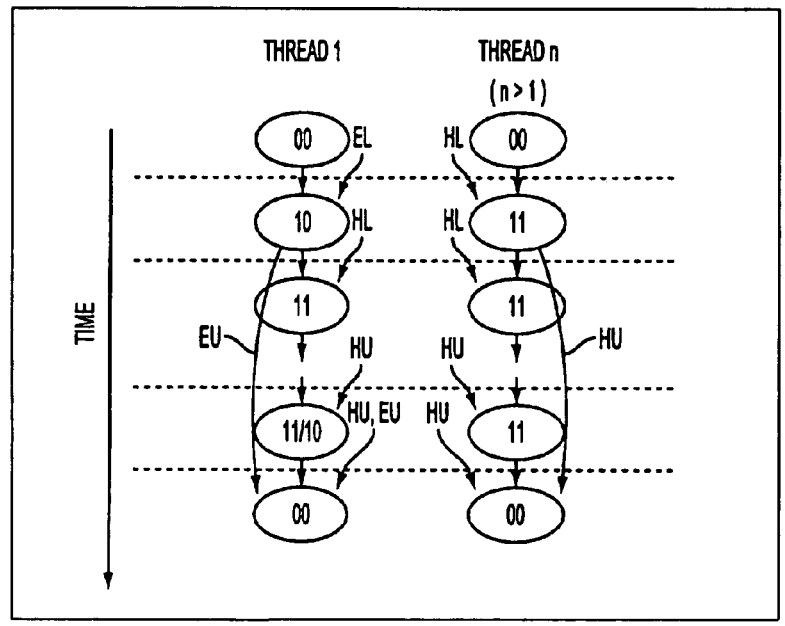
FIG. 6 depicts an exemplary embodiment of a two-bit locking scheme according to an exemplary embodiment of the invention.

Referring now to the drawings, FIG. 6 illustrates an example of possible lock operations according to an exemplary embodiment of the invention. As can be seen in FIG. 6, an exemplary embodiment on the invention, may include, but is not limited to, four possible lock operations: "easy" lock EL, "easy" unlock EU, "heavy" lock HL, and "heavy" unlock HU. As can be seen in FIG. 6, an "easy" lock EL of thread 1 may change the two-bit lock from "00" to "10" automatically, for example. An "easy" unlock EU may revert the two-bit lock from "10" to "00". As will be understood by a person having ordinary skill in the art, when these "easy" locks and unlocks occur, the programming system may encode the lock owner and recursion counter, for example, in the two bits.

In an exemplary embodiment of the invention, a "heavy" lock HL may occur when two bits may not provide enough space for encoding both the lock owner and the recursion counter, for example. During a "heavy" lock HL, an auxiliary data structure (not shown) may be automatically created, for example, to hold any other necessary information, for example. As can be seen in FIG. 6, "heavy" locks HL may occur when the programming system changes the lock bits of thread 1 from "10" to "11", for example, or when thread n is recursively locked (i.e., when the programming system locks the same thread multiple times), for example.

In an exemplary embodiment of the invention, a "heavy" unlock HU may occur when the programming system may be required to access external lock information that may be stored in an auxiliary data structure, for example. During a "heavy" unlock, the programming system may look for the external lock information associated with the object and decrement the recursion counter, for example. When the lock is free, i.e., the lock bits are "00", the auxiliary data structure may be destroyed or disconnected, for example, from the relevant object.

In an exemplary embodiment of the invention, if thread 1, for example, locks an object that is already in an "easy" lock state, for example, the "easy" lock may be inflated to a "heavy" lock state with the two bits becoming "11" as is shown in Table 1 and FIG. 6. On the other hand, when the inflated lock is unlocked, for example, with the recursion counter (i.e., the second lock bit) reaching "1", the lock may be deflated to an "easy" lock, or remain as a "heavy lock".

Figure 7:
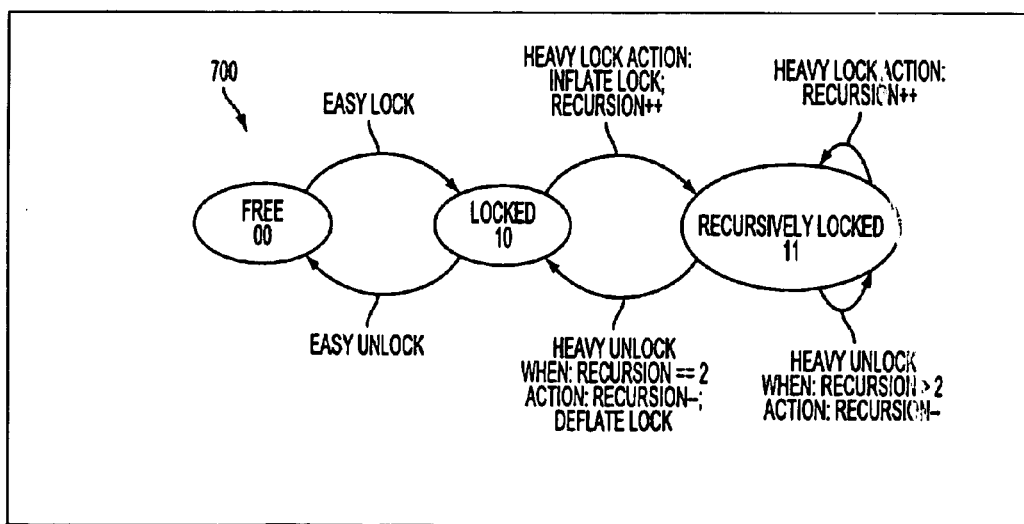
FIG. 7 depicts an exemplary embodiment of a two-bit locking sequence according to an exemplary embodiment of the invention.

FIG. 7 depicts an exemplary embodiment of a lock sequence 700 of an exemplary thread according to an exemplary embodiment of the invention. As is shown in FIG. 7, when an "easy" lock occurs, the "free" lock may be changed from "00" to "10". In an exemplary embodiment of the invention, when a "heavy" lock occurs, for example, the two-bit lock may be changed from "10" to "11". In an exemplary embodiment of the invention, changing the two-bit lock from "10" to "11" may be referred to as "inflating the lock". Once a "heavy" lock occurs, for example, subsequent locks to the same thread may cause the programming system to update the information that may be stored in the auxiliary data structure. Similarly, when a "heavy" unlock occurs and the recursion value is greater than 2 (i.e., the same thread has been locked more that twice), recursive unlocks to the same thread may cause the programming system to update the information that may be stored in the auxiliary data structure. In an exemplary embodiment of the invention, when the recursion value is equal to two, a "heavy" unlock may occur and the two-bit lock may be changed from "11" to "10". Changing the two-bit lock from "11" to "10" may be referred to as "deflating the lock". As can be seen in FIG. 7, in an exemplary embodiment of the invention, an "easy" unlock may occur when the two-bit lock is changed from "10" to "00".

As discussed above, in an exemplary embodiment of the invention, more than two bits may be used to encode locking information into a compact object header. In an exemplary embodiment of the invention, three bits, for example, may be used to encode the locking information. In such an embodiment, one bit may be indicate whether the object is easy locked, i.e., locked only once by a main thread. The other two bits may be used, for example, to express easy lock situations. For example, encoding the bit scheme "00" into the second and third bits of a three-bit locking scheme may indicate that the associated object is locked once by the main thread. Similarly, encoding the bit scheme "01" into the second and third bits of the a three-bit locking scheme may indicate that the associated object in locked twice by the main thread.

In a further embodiment of the invention, the second and third bits may be used to indicate how many times an associated object is locked by a main thread. For example, the encoded bit schemes "00", "01", and "10" may indicate that the associated object may be locked once, twice, and thee times, respectively, for example, by the main thread. In still a further exemplary embodiment of the invention, a 4-bit locking scheme may be implemented, for example. In such an exemplary embodiment, 3 bits, for example, may be used to express various easy lock scenarios, as would be understood by a person having ordinary skill in the art.

As discussed above, in an exemplary embodiment of the invention, any number of the least significant bits of a compact object header may be reserved to store a hash code or hash code information. In an exemplary embodiment of the invention, 3-4 bits, for example, may be reserved to store a hash code seed, for example. As will be understood by a person having ordinary skill in the art, a hash code seed may be a part of the hash code that may be used to keep the number of collision cases under an acceptable threshold. In an exemplary embodiment of the invention, this hash code seed may be combined with other information, such as, e.g., the class information to further reduce the number of collision cases.

In an exemplary embodiment of the invention, any number of the least significant bits of a compact object header may be reserved to store garbage collection information, such as, e.g., marking information. In still a further exemplary embodiment of the invention, any number of the least significant bits of a compact object header may be reserved for fast reflection. As will be understood by a person having ordinary skill in the art, fast reflection may be used to determine whether an associated object is a low-level object or a language object, or whether the object is an array object, for example. In an exemplary embodiment of the invention, the employment of reflection assist the programming system with type checking, for example.

Figure 8:
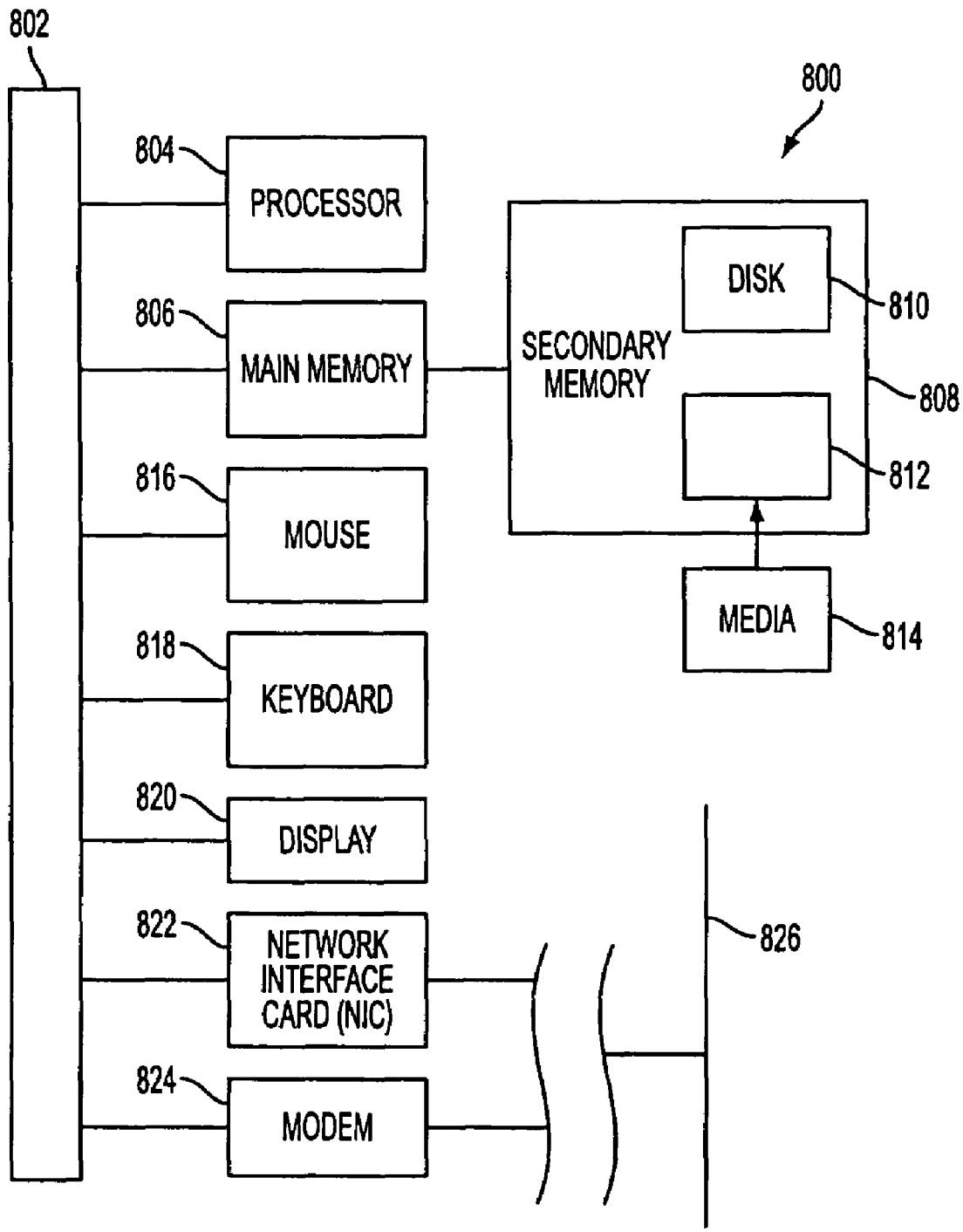
FIG. 8 depicts an exemplary embodiment of a computer and/or communications system as can be used for several components in an exemplary embodiment of the invention.

FIG. 8 depicts an exemplary embodiment of a computer and/or communications system as may be used for several components of the programming system in an exemplary embodiment of the present invention. FIG. 8 depicts an exemplary embodiment of a computer 800 as may be used for several computing devices in exemplary embodiments of the present invention. Computer 800 may include, but is not limited to: e.g., any computer device, or communications device including, e.g., a personal computer (PC), a workstation, a mobile device, a phone, a handheld PC, a personal digital assistant (PDA), a thin client, a fat client, an network appliance, an Internet browser, a paging, or alert device, a television, an interactive television, a receiver, a tuner, a high definition (HD) television, an HD receiver, a video-on-demand (VOD) system, a server, or other device. Computer 800, in an exemplary embodiment, may comprise a central processing unit (CPU) or processor 804, which may be coupled to a bus 802. Processor 804 may, e.g., access main memory 806 via bus 802. Computer 800 may be coupled to an Input/Output (I/O) subsystem such as, e.g., a network interface card (NIC) 822, or a modem 824 for access to network 826. Computer 800 may also be coupled to a secondary memory 808 directly via bus 802, or via main memory 806, for example. Secondary memory 808 may include, e.g., a disk storage unit 810 or other storage medium. Exemplary disk storage units 810 may include, but are not limited to, a magnetic storage device such as, e.g., a hard disk, an optical storage device such as, e.g., a write once read many (WORM) drive, or a compact disc (CD), or a magneto optical device. Another type of secondary memory 808 may include a removable disk storage device 812, which can be used in conjunction with a removable storage medium 814, such as, e.g. a CD-ROM, or a floppy diskette. In general, the disk storage unit 810 may store an application program for operating the computer system referred to commonly as an operating system. The disk storage unit 810 may also store documents of a database (not shown). The computer 800 may interact with the I/O subsystems and disk storage unit 810 via bus 802. The bus 802 may also be coupled to a display 820 for output, and input devices such as, but not limited to, a keyboard 818 and a mouse or other pointing/selection device 816.

The embodiments illustrated and discussed in this specification are intended only to teach those skilled in the art the best way known to the inventors to make and use the invention. Nothing in this specification should be considered as limiting the scope of the present invention. All examples presented are representative and non-limiting. The above-described embodiments of the invention may be modified or varied, without departing from the invention, as appreciated by those skilled in the art in light of the above teachings. It is therefore to be understood that the invention may be practiced otherwise than as specifically described.

What is claimed is:

1. A method comprising:
   aligning an address stored in a K-bit word having N least significant bits such that the N least significant bits are zero; and
   encoding information in N bits; and
   storing the encoded information in the N least significant bits of the K-bit word, wherein the encoded information about the object comprises at least one of hash code information, lock information, garbage collection information, and reflection information.

2. The method according to claim 1, wherein the address is a pointer to where runtime properties of an object are stored in memory.

3. The method according to claim 1, wherein the address is a pointer to at least one of metadata and a table of virtual functions within a class.

4. The method according to claim 1, wherein the encoded information is information about an object.

5. The method according to claim 1, wherein aligning comprises:
- allocating a memory space to store the runtime properties of an object;
- storing the runtime properties of the object at an address within the memory space such that the N least significant bits of the address are zero; and
- storing the address in the K-bit word.

6. The method according to claim 5, wherein the memory space is larger than an amount of space necessary to store the runtime properties of the object.

7. The method according to claim 1, wherein N is equal to eight.

8. The method according to claim 1, further comprising: encoding lock information into at least two of said N least significant bits.

9. The method according to claim 8, said encoding lock information comprising:
- storing a zero in the a bit of a two-bit lock code and a zero in a second bit of said two-bit lock code if an associated object is not locked;
- storing a one in the first bit of said two-bit lock code and a zero in the second bit of said two-bit lock code if an associated object is locked by one thread; and
- storing a one in the first bit of said two-bit lock code and a one in the second bit of said two-bit lock code if an associated object is at least one of recursively locked by the same thread and locked by multiple threads.

10. A device comprising:
- first and second addressable units, the first addressable unit storing a K-bit word, the K-bit word having N least significant bits and including
  - an address of the second addressable unit, wherein the address of the second addressable unit is an address at which the N least significant bits are equal to zero, and
  - encoding information in N bits; and
  - storing the encoded information in the N least significant bits of the K-bit word, wherein the encoded information about the object comprises at least one of hash code information, lock information, garbage collection information, and reflection information.

11. The device according to claim 10, wherein the K-bit word is a pointer to the second addressable unit.

12. The device according to claim 10, wherein the second addressable unit comprises least one of metadata and a table of virtual functions within a class.

13. The device according to claim 10, wherein the encoded information is information about an object.

14. The device according to claim 10, wherein N is equal to eight.

15. The device according to claim 10, wherein the information includes a a lock code comprising at least two bits.

16. The device according to claim 15, wherein said lock code is a two-bit lock code, and wherein the two-bit lock code indicates one of a free lock, an easy lock, and a heavy lock.

17. A machine accessible medium containing program instructions that, when executed by a processor, cause the processor to:
- align an address stored in a K-bit word having N least significant bits such that the N least significant bits are zero; and
- encode information in N bits; and
- store the encoded information in the N least significant bits of the K-bit word, wherein the encoded information about the object comprises at least one of hash code information, lock information, garbage collection information, and reflection information.

18. The machine accessible medium according to claim 17, wherein the address is a pointer to where runtime properties of an object are stored in memory.

19. The machine accessible medium according to claim 17, wherein the address is a pointer to at least one of metadata and a table of virtual functions within a class.

20. The machine accessible medium according to claim 17, wherein the encoded information is information about an object.

21. The machine accessible medium according to claim 17, further comprising instructions that, when executed by a processor, cause the processor to:
- allocate a memory space to store the runtime properties of an object;
- store the runtime properties of the object at an address within the memory space such that the N least significant bits of the address are zero; and
- store the address in the K-bit word.

22. The machine accessible medium according to claim 21, wherein the memory space is larger than an amount of space necessary to store the runtime properties of the object.

23. The machine accessible medium according to claim 17, wherein N is equal to eight.

24. The machine accessible medium according to claim 17, further comprising instructions that, when executed by a processor, cause the processor to:
- encode lock information into at least two of the N least significant bits.

25. The machine accessible medium according to claim 17, further comprising instructions that, when executed by a processor, cause the processor to:
- store a zero in a first bit of a two-bit lock code and a zero in a second bit of said two-bit lock code if an associated object is not locked;
- store a one in the first bit of said two-bit lock code and a zero in the second bit of said two-bit lock code if an associated object is locked by one thread; and
- store a one in the first bit of said two-bit lock code and a one in the second bit of said two-bit lock code if an associated object is at least one of recursively locked by the same thread and locked by multiple threads.

* * * * *